(12) United States Patent
Joosten

(10) Patent No.: US 10,145,358 B2
(45) Date of Patent: Dec. 4, 2018

(54) WIND TURBINE, ITS USE AND A VANE FOR USE IN THE TURBINE

(71) Applicant: Wilhelmus Helena Hendrikus Joosten, Arcen (NL)

(72) Inventor: Wilhelmus Helena Hendrikus Joosten, Arcen (NL)

( * ) Notice: Subject to any disclaimer, the term of this patent is extended or adjusted under 35 U.S.C. 154(b) by 1004 days.

(21) Appl. No.: 14/403,390

(22) PCT Filed: Jul. 3, 2013

(86) PCT No.: PCT/EP2013/063997
§ 371 (c)(1),
(2) Date: Nov. 24, 2014

(87) PCT Pub. No.: WO2014/006075
PCT Pub. Date: Jan. 9, 2014

(65) Prior Publication Data
US 2015/0118050 A1    Apr. 30, 2015

(30) Foreign Application Priority Data

Jul. 6, 2012 (EP) ..................................... 12075082

(51) Int. Cl.
*F03D 3/06* (2006.01)
*F03D 3/00* (2006.01)
*F03D 15/00* (2016.01)

(52) U.S. Cl.
CPC ............. *F03D 3/068* (2013.01); *F03D 3/005* (2013.01); *F03D 15/00* (2016.05); *F05B 2240/212* (2013.01); *F05B 2240/218* (2013.01); *Y02E 10/74* (2013.01)

(58) Field of Classification Search
CPC .................................. F03D 3/067; F03D 3/068
USPC ........................................................... 415/4.2
See application file for complete search history.

(56) References Cited

U.S. PATENT DOCUMENTS

| | | | | |
|---|---|---|---|---|
| 925,063 A * | 6/1909 | White | ........................... | 416/117 |
| 2,441,635 A * | 5/1948 | Iverson | ................... | F03D 3/067 |
| | | | | 416/117 |
| 2,918,128 A * | 12/1959 | Mallinckrodt | ........ | F04D 29/366 |
| | | | | 416/132 R |
| 3,920,354 A * | 11/1975 | Decker | ................... | F03D 3/067 |
| | | | | 416/117 |
| 4,247,253 A * | 1/1981 | Seki | ........................ | F03D 3/065 |
| | | | | 416/119 |

(Continued)

*Primary Examiner* — David E Sosnowski
*Assistant Examiner* — Juan G Flores
(74) *Attorney, Agent, or Firm* — Richard M. Goldberg

(57) ABSTRACT

A wind turbine for converting wind into mechanical energy, includes a support and a vane rotatably connected to the support, the vane including a wind receptacle that can adopt a first configuration when the vane is in a position to travel in the direction of the wind, in which first configuration the receptacle has a first capacity to convert wind force into motion of the vane, and a second configuration when the vane is in a position to travel against the direction of the wind, in which second configuration the receptacle has a second capacity to convert wind force into motion of the vane, the second capacity being lower than the first capacity, wherein the turbine is provided with an arrangement that is operable to force the receptacle to adopt at least one of the configurations independent from the direction of the wind.

13 Claims, 5 Drawing Sheets

(56) References Cited

U.S. PATENT DOCUMENTS

| | | | | |
|---|---|---|---|---|
| 4,547,125 | A * | 10/1985 | McMahon, II | F03D 3/068 |
| | | | | 416/117 |
| 4,684,817 | A * | 8/1987 | Goldwater | F03D 3/067 |
| | | | | 290/55 |
| 5,525,037 | A * | 6/1996 | Cummings | F03D 3/067 |
| | | | | 416/117 |
| 5,570,997 | A | 11/1996 | Pratt | |
| 6,682,302 | B2 * | 1/2004 | Noble | F03D 3/068 |
| | | | | 415/4.2 |
| 6,853,096 | B1 * | 2/2005 | Yu | F03D 3/067 |
| | | | | 290/43 |
| 7,077,628 | B1 * | 7/2006 | Acord | F03D 3/067 |
| | | | | 415/4.2 |
| 7,931,440 | B2 * | 4/2011 | Bobowick | F03D 3/067 |
| | | | | 415/117 |
| 8,177,481 | B2 * | 5/2012 | Liang | F03D 3/067 |
| | | | | 415/4.2 |
| 2004/0057829 | A1 * | 3/2004 | Khan | F03D 3/067 |
| | | | | 416/17 |
| 2004/0086373 | A1 * | 5/2004 | Page, Jr. | F03D 3/067 |
| | | | | 415/4.2 |
| 2007/0160477 | A1 * | 7/2007 | Kneller | F03D 3/005 |
| | | | | 416/223 R |
| 2008/0019832 | A1 | 1/2008 | Anderson | |
| 2009/0261595 | A1 | 10/2009 | Poo | |
| 2010/0090474 | A1 * | 4/2010 | Anguelo | F03D 3/02 |
| | | | | 290/55 |
| 2010/0143133 | A1 * | 6/2010 | Bobowick | F03D 3/067 |
| | | | | 416/117 |
| 2011/0027079 | A1 | 2/2011 | Corrado | |
| 2012/0045333 | A1 | 2/2012 | Al-Azzawi | |
| 2012/0121380 | A1 * | 5/2012 | Tein | F03D 3/067 |
| | | | | 415/4.2 |

* cited by examiner

WIND TURBINE, ITS USE AND A VANE FOR USE IN THE TURBINE

FIELD OF THE INVENTION

The present invention pertains to a wind turbine for converting wind into mechanical energy, comprising a support and a vane rotatively connected to said support, the vane comprising a wind receptacle that can adopt a first configuration when the vane is in a position to travel in the direction of the wind, in which first configuration the receptacle has a first capacity to convert wind force into motion of the vane, and a second configuration when the vane is in a position to travel against the direction of the wind, in which second configuration the receptacle has a second capacity to convert wind force into motion of the vane, the second capacity being lower than the first capacity. The invention also pertains to the use of the wind turbine for converting wind into work, and to a vane for use in the wind turbine.

BACKGROUND OF THE INVENTION

Wind turbines are commonly used since centuries to convert wind into work. A wind turbine typically is an impulse turbine. The turbine changes the direction of flow of the wind and the resulting impulse spins the turbine and leaves the wind with diminished kinetic energy. If the mechanical energy is used to produce electricity, the device may be called a wind generator or wind charger. If the mechanical energy is used to drive machinery, such as for grinding grain or pumping water, the device is usually called a windmill or wind pump. Developed for over a millennium, today's wind turbines are manufactured in a range of vertical and horizontal axle types. The most common and oldest ones are the horizontal axle turbines, wherein the axles are positioned in line with the direction of the wind (i.e. the direction in which the wind blows). The smallest turbines are used for applications such as battery charging or auxiliary power on sailing boats, while large grid-connected arrays of turbines are becoming an increasingly large source of commercial electric power.

One of the developments of the last decades is to devise wind turbines that are suitable for low wind velocities (typically below 10 m/s, about 5 Beaufort). In particular at lower heights, above land and in the presence of buildings, wind velocity is often too low to economically extract energy from common wind turbines. Recent developments include the Darrieus (including giromill and cycloturbine) and Savonius wind turbines which may generate mechanical energy even at a wind velocity below 5 m/s (about 3 Beaufort). Unlike the Savonius wind turbine, the Darrieus is a lift-type turbine. Rather than collecting the wind in cups (also called "buckets" in the art, referred to as wind receptacles in this specification) dragging the turbine around, a Darrieus uses lift forces generated by the wind hitting aerofoils to create rotation. With these turbines, the axles are positioned transverse to the wind (as opposed to "in line" with the wind) which has the additional advantage that the vanes do not need to be pointed to the wind. In most cases the axles are positioned vertically (which explains the commonly used acronym VAWT: vertical axle wind turbine), but they may also be positioned horizontally as long as the axle is transverse to the wind (TAWT—transverse axle wind turbine—would thus be a more correct acronym), typically substantially perpendicular to the direction in which the wind blows. These wind turbines however have several disadvantages. Firstly, the overall rate of conversion of kinetic into mechanical energy of these turbines might be improved. Secondly, in particular Darrieus wind turbines are not self-starting. Therefore a small powered motor is required to start off the rotation, and then when it has enough speed the wind passing across the aerofoils starts to generate torque and the rotor is driven around by the wind. An alternative constitution is the use of one or two small Savonius rotors that are mounted on the shaft of the Darrieus turbine to start rotation. These Savonius rotors however slow down the Darrieus turbine when it gets going.

From CN 101737252A a wind turbine according to the preamble is known. This wind turbine is also used to start a Darrieus type of turbine. A disadvantage however is that like other VAWT's, the overall rate of energy conversion is relatively low.

From US2012/0045333 a wind turbine is known wherein the wind receptacle is formed by a sail being blown against a rack, the rack having an adjustable configuration. This way, when the wind is blowing the sail against the rack with too high forces, the receptacle can be reconfigured to have a smaller capacity to convert wind force into motion of the vane simply by letting more wind blow through the various adjacent sails. When the vane travels against the direction of the wind, the sail is blown away from the rack in order to provide a minimum counterforce against the revolving motion of the turbine. Reconfiguration of the rack is then not applied, simply because it has no effect on the capacity of the wind receptacle (i.e. the sail).

U.S. Pat. No. 5,570,997 discloses a wind turbine having a vane provided with a wind receptacle that opens when the vane is traveling in the direction of the wind and closes when the vane is traveling against the direction of the wind. This way, maximum capacity of the wind receptacle is used when the wind force has to be converted into motion of the vane, while the receptacle hardly counteracts this conversion when the vane travels against the direction of the wind. The receptacle opens by action of the wind blowing over the vane and closes under gravity when this wind action decreases.

OBJECT OF THE INVENTION

It is an object of the invention to devise a wind turbine that mitigates at least part of the prior art disadvantages.

SUMMARY OF THE INVENTION

In order to meet the object of the invention, a wind turbine according to the preamble has been devised wherein the turbine is provided with a means that is operable to force the receptacle to adopt at least one of the said configurations independent from the direction of the wind (i.e. the means may be operated to force the receptacle to adopt one of these configurations, not dependent on the wind forces that act on the turbine). This does not exclude however, that the configurations will be adapted to the direction of the wind, for example in order to maximize energy conversion or to slow down the turbine.

In the prior art turbine as known from the above referenced Chinese patent application (as well as the U.S. Pat. No. 5,570,997 patent), the configuration the receptacle takes depends in essence on external forces such as gravity and wind forces. As may be seen in FIG. 3a of the Chinese application, the receptacle that has the second configuration (i.e. the receptacle on the right hand side of the figure), in particular at low wind speed, still has a considerable large frontal foot-print (i.e. the hinged lid still extends over a considerable length in a direction perpendicular to the wind). This means that this receptacle negatively converts wind energy into motion of the turbine. Although this negative effect is considerable smaller than the positive conversion provided by the left hand side receptacle, current applicant acknowledged the existence of this disadvantage and its effect on the energy conversion. Although at higher wind speeds, such as depicted in FIGS. 3b and 3c, this disadvantage is less pronounced or even completely gone, it was applicant's recognition that the known wind turbine could be improved substantially by adding means that induce the second configuration in this set-up (i.e. when the receptacle comprises a lid that hangs from the vane), thus by using internal forces created by the constitution of the wind turbine itself. This way, the second configuration can be forced to be such that the negative conversion of wind energy into motion is substantially smaller than in the situation wherein the second configuration depends solely on external forces such as gravity and wind. When applied to the turbine as depicted in FIGS. 3a to 3c in the Chinese application, by using the present invention, the right hand side receptacle in FIG. 3a, could have the configuration of the right hand side receptacle as depicted in FIG. 3b or even 3c. In case the receptacle would be placed on top of the vane, such that it for example may take the second configuration under influence of gravity and the wind, the means could be operable to force the receptacle to open, i.e. take the first configuration, when the vane is in a position to travel in the direction of the wind.

Advantages of the present wind turbine are that the energy conversion is considerable higher than with known wind turbines, in particular at low wind speeds. Also, due to the fact that the receptacle may be forced to actively take a configuration (against the forces of gravity and/or wind) makes that the turbine requires only a very low wind velocity to start turning around. Next to this, by being independent from the direction of the wind for adopting either of the two configurations, the present invention allows not only to achieve maximum conversion of wind force into motion, it also allows to adopt a configuration that slows down the turbine if needed. For this namely, the receptacle typically has to be forced to take the needed configuration against the direction of the wind forces and gravity.

The means that are operable to force the receptacle to adopt a configuration, can have various embodiments as will be appreciated by any person having skill in the art of mechanics. The means could be constituted using mere mechanical parts such as levers, bars and sprockets, camshafts, rails and followers, optionally using hydraulics, or could be constituted using electromechanical parts such as (electro-)magnets, inducers, coils etc. Various other constitutions somewhere in the spectrum (or even outside) between pure mechanical and pure electrical are of course usable.

The present invention also pertains to the use of a wind turbine as defined here-above for converting wind into work. The invention also pertains to a combination of the present turbine with a Darrieus wind mill, the wind turbine being operatively connected to the Darrieus wind mill, wherein the operative connection uses a clutch that allows that the wind turbine to rotate at various revolutions per minute for a predetermined number of revolutions per minute for the Darrieus wind mill. In this combination, the wind turbine may be used to start the Darrieus mill. Since the present turbine will start to revolve at a very low wind velocity, it may rev up easily and for example when reaching a certain torque or revolutions per minute, the clutch may be used to transfer at least part of the kinetic energy of the turbine to start the Darrieus mill. Also, at very high revelations of the Darrieus mill, by forcing the first configuration when the wind receptacle travels against the direction of the wind, the Darrieus mill may be slowed down using the present turbine. The present invention also pertains to a vane provided with a receptacle as defined here-above and means for use in adopting the first and second configuration.

It is noted that a wind turbine according to the present invention can be operatively connected to a ground plane, typically having a support (such as a rotating or stationary axle) extending in a vertical direction, but may also be placed with its support extending in a horizontal direction (as long as the axis of rotation of the vane extends transverse to the wind) for example by mounting the support against a vertically extending wall. Also, the turbine can for example be placed on a floating raft or be placed on a pole that extends above water level.

DEFINITIONS

A vane: a usually relatively thin, rigid and flat element that when mounted along an axis is turned by a gas or fluid flowing across the vane. Typical examples are a blade in a turbine or a sail on a windmill.

Capacity of a receptacle to convert wind force into motion is the conversion a receptacle can provide when this receptacle is ideally positioned with respect to the direction of the wind (i.e. the receptacle is positioned such that the wind is maximally "caught").

Configuration of an object: the form determined of the arrangement the parts of the object in relation to each other and in space.

The direction of the wind: the main direction in which the wind blows

Wind receptacle: an element that extends in a direction perpendicular to the direction of the wind in order to convert the force of the wind into a motion in the direction of the wind. Typically a wind receptacle has the form of a cup or bucket, but it may be as simple as a flat, rectangular, tile shaped object.

A first element that extends perpendicular to a second one: the first element at least partly extends transverse to the second element. For example, if two straight lines cross at an angle of 40°, the first line extends in a direction perpendicular to the second one in the sense of the present specification.

A vane that travels in essence in the direction of the wind means that the vane is positively converting the force of the wind into motion (forward travel).

A vane that travels in essence against the direction of the wind means that energy is needed to force the vane to travel back through the wind (backwards travel)

EMBODIMENTS OF THE INVENTION

In an embodiment of the wind turbine according to the invention, the receptacle adopts one of the said two configurations in essence under the influence of gravity and the wind, and the other configuration in essence by operation of said means. This embodiment requires no active operation of any means to have the receptacle to take one of the two configurations which makes the construction relatively simple. For example, if the receptacle is formed such that it can take the second configuration in essence by gravity and wind acting on (parts of) the receptacle, it does not need the operation of the means to take that configuration. In such a case, it is typically required that operation of the means is necessary to change the configuration in the opposite direction to provide the first configuration.

In an alternative embodiment the means are operable such that the receptacle adopts the second configuration in essence by operation of said means, in particular when the vane is in a position to travel against the direction of the wind. This embodiment has the advantage that the standard configuration of the receptacle is the first configuration, i.e. the configuration wherein the receptacle has the larger capacity to convert wind force into motion. This way, when wind starts blowing the turbine will easily start rotating. Preferably in this embodiment, the vane is aligned to the wind automatically (for example with means as commonly known in the art) such that the vane takes a position wherein the receptacle may catch the wind. The advantage of taking the second configuration when the vane is in a position to travel against the direction of the wind is that the negative effect the receptacle then has on the overall conversion of wind force into motion can be actively minimised, and thus, does not (passively) depend on external forces such as wind and gravity.

In yet another embodiment the means are operable such that the receptacle adopts the first and second configuration in essence by operation of said means. Although this embodiment is more complex than the above mentioned one, and also, may lower the overall energy conversion rate slightly (since active closing and opening of the receptacle may cost energy), this embodiment has the advantage that the configuration of the receptacle can be adjusted to any configuration in the spectrum between the first and second configuration, independent of the position the vane takes with respect to the direction of the wind. This improves the freedom of operation for use of the wind turbine.

In an embodiment the vane is an aerofoil shaped body, wherein the receptacle is in essence formed by a lid and the aerofoil body, the lid being hinged to the body at a position adjacent a downstream end of the said body (the downstream end of the body being the end of the body that is faced away from the wind the vane moves in the direction of the wind). This embodiment has the advantage of being simpler in construction than when using e.g. deformable cups such as deformable spheroids or other shapes, and more effective than for example a vane in the form of a longitudinal pole having lids, or other constitutions.

In an embodiment the vane comprises multiple receptacles. It is applicant's recognition that when using multiple receptacles, the freedom to operate the turbine to increase the energy conversion can be further improved. More importantly however, it was applicant's recognition that having multiple receptacles allows the use of vanes of a significant longer length than when using one (large) receptacle that extends over a corresponding length of the vane. At high rotational speeds namely, the forces generated on the vane near the tip of the vane are significantly larger than the forces generated on the vane near the support. By having multiple independent receptacles, one can for example allow "outer" receptacles to take a configuration that has a lower capacity to convert wind force into motion, in order to reduce the mechanical impact on the vane. This on its turn allows using larger vanes, without necessarily needing very robust mechanical constructions. In a further embodiment the vane comprises a first receptacle at a top site of the vane and a second receptacle at a bottom side of the vane. In this embodiment near optimal use can be made of the receptacles and their capacity to convert wind energy into motion.

In an alternative embodiment the vane comprises multiple separate receptacles positioned along the length of the vane. Applicant recognised that the hydrodynamics (the flow of the air) along the length of the vane changes considerably when traveling from a position near the support (adjacent the heart of the turbine) to the tip of the vane. By using separate receptacles along the length of the vane, receptacles may have different configurations along the length of the vane accommodated to the differences in hydrodynamics. In a further embodiment a receptacle positioned near the support has a larger cross-section than a receptacle positioned further away from the support. This way, change in absolute traveling speed of the different portions along the length of the vane can be accommodated to. Typically adjacent the tip, the speed is so high that a small cross section of the receptacle may be needed to prevent that the construction needs to be very heavy to maintain rigidity of the vane. This concept can be applied for a turbine that has a different or even no means to force a receptacle to adopt at least one of the said configurations independent from the direction of the wind. In particular, even when the receptacles open and close merely under forces of wind and gravity, the feature of having multiple receptacles that have a decreasing maximum capacity to convert wind force into motion along the length of the vane can be advantageously used in a wind turbine to allow larger vane lengths. In other words, the invention is also embodied in a wind turbine wherein the said first and second configurations are induced by mere wind and/or gravitational forces (instead of using the means to force the receptacles to take the first and second configurations), wherein the vane comprises multiple separate receptacles positioned along the length of the vane, and wherein a receptacle positioned near the support has a larger maximum capacity to convert wind force into motion than a receptacle positioned further away from the support.

In an embodiment the receptacles are operatively connected such that when a receptacle adopts the second position, a receptacle next to the receptacle that adopts the second position, viewed in the direction away from the support, automatically adopts the second position. In this embodiment neighbouring receptacles simply grasp each other such that when one receptacle is forced to take the second configuration, the receptacle next to this one, viewed in the direction towards the tip of the vane also takes the second configuration. In this embodiment the means are operable to force the receptacles to take the second configuration only by having to actively force one single receptacle (typically the one nearest to the centre of the turbine). The other receptacles follow the movement of the first one. This avoids the need of a means that has to be constructed such that it directly acts on all receptacles of a vane. Disadvantage is that for taking the second configuration, the multiple receptacles on a vane cannot be operated independently.

In an embodiment wherein the vane is part of a rotor that is rotatively connected to the support, the rotor comprises multiple vanes. When having multiple vanes, a very even distribution of the vanes may be provided, such that there is always at least one vane present that takes a position such that it can positively convert wind into motion. When distributed exactly evenly, each vane may cover for example a segment of between 30° (12 vanes) and 180° (2 vanes) of rotation. It was found that this way not only a good energy conversion can be obtained but also that the conversion may be relatively smooth, with little momentum on the support. In a further embodiment the turbine comprises multiple rotors.

The invention will be further explained based on the following examples.

BRIEF DESCRIPTION OF THE DRAWINGS

FIG. 1

FIG. 1 is a schematic representation of a wind turbine according to the invention. Depicted is a turbine 1 that is mounted to extend from the ground surface 2 using a support pole 5. The turbine in this embodiment comprises two vanes (6,16), each vanes comprising multiple receptacles (7,17) to catch the wind and aid in converting wind energy (the direction of the wind is indicated as V) into a rotative motion of the vanes (in the indicated direction A). The vane 6 and its receptacles are depicted in greater detail in FIG. 2.

FIG. 2

FIG. 2 is a schematic representation of a vane according to the invention. The vane 6 in this particular embodiment is directed to the wind V such that its upstream end 600 faces the wind and its downstream end 60 is faced away from the wind. The vane 6 in this embodiment is an aerofoil shaped body such that the wind travelling over and beneath the vane provides for a driving force on the vane in the direction of the wind. The vane 6 is at its bottom as well as its top side provided with multiple receptacles 7 and 7' respectively. The receptacles 7 at the bottom side are in each case comprised of a lid and the bottom side of the vane. Five lids 10, 11, 12, 13 and 14 are depicted in FIG. 2. Lid 10 is positioned nearest the support (w=not shown in FIG. 2), lid 14 is positioned near the tip of the vane 6. Each lid, together with the bottom side of the vane forms more or less a bucket to catch the wind. The lids 10, 11, 12, 13 and 14 are hinged around line 21, and are in the interior of the vane provided with contra-weights 101 through 115 respectively. These weights in this embodiment are chosen such that the lids open in essence under the influence of gravity. By varying the contra-weight, the movement of the lids with respect to gravity and the speed of the wind (relative to the vane) can be precisely chosen to provide for optimum torque under the chosen circumstances. The lids 10, 11, 12, 13 and 14 are operatively connected such that when a receptacle adopts the second position, a receptacle next to the receptacle that adopts the second position, viewed in the direction away from the support, automatically adopts the second position. In this case, lid 11 is provided with a sub-lid 121 that lies across the space of movement of lid 10. When lid 10 is moved towards the vane to adopt the second configuration, it encounters sub-lid 121 and thus takes lid 11 with it in the direction of the bottom of the vane. On its turn, lid 12 is provided with sub-lid 122, which lies across the space of movement of lid 11. Thus, when lid 11 moves in the direction of the vane, it encounters sub-lid 122 and thus takes lid 12 with it towards the bottom of the vane to take the second configuration. The same way, lid 13 is provided with sub-lid 123 and lid 14 is provided with sub-lid 124. Correspondingly, lids 10', 11', 12', 13' and 14' are provided with sub-lids 120', 121', 122', 123' and 124'. These lids are hinged around line 20 and provided with contra-weights, in the interior of the vane, 101' through 115'. These contra-weights are chosen such that the lids open under the influence of gravity to take the first configuration.

FIG. 3

FIG. 3 is a schematic representation of a wind turbine according to the invention, comprising two vanes 6 and 16 that are part of a rotor 166. FIG. 3 depicts means (200, 200') operable to force the receptacles 7 (comprising lids 10-14, 10'-14', 110-114 and 110'-114' respectively) to adopt the second configuration. In this figure a wind turbine 1 is depicted comprising two vanes 6 and 16 which are substantially of the same constitution as the vane 6 depicted in FIG. 2. Each vane comprises 10 receptacles (vane 6: receptacles 7 formed by lids 10-14 and the corresponding bottom parts of the vane, as well as the receptacles formed by lids 10'-14' and the corresponding parts of the top side of the vane 6; vane 16: receptacles formed by lids 110-114 and the corresponding bottom parts of the vane, as well as the receptacles formed by lids 110'-114' and the corresponding parts of the top side of the vane 16). The turbine 1 is comprised of a first means 200 operable such that the receptacles comprising lids 110-114 adopt the second configuration in essence by operation of said means. These means 200 comprise a first lever 201, which is pushed downwards by a pushing force of sub-lid 120 (see also FIG. 3) that has moved downwards due to gravity and wind forcing lid 10 down. The downward force on lever 201 is used to push lever 202 upwards. This way, lid 110 (behind vane 16; as such not shown), by virtue of lever 202 acting on its corresponding sub-lid 1120 (not shown), is pushed upwards such that the receptacle comprising lid 110 takes the second configuration (virtually "closed" in this embodiment). In order to correctly convert the movement from lever 201 to lever 202, means 200 comprise a converter 204. Means 200 may rotate around support 5 using bearing 203 to move in conjunction with the vanes. Converter 204 acts upon the levers to make sure the receptacles adopt the first configuration when a vane moves in the direction of the wind V, and the second configuration when the vane moves against the wind V. For this, the converter is aligned to the direction of the wind electronically (electronics not shown). In an alternative embodiment, the converter is aligned to the wind using a commonly known vane that is automatically aligned to the wind, which vane on its turn is operatively connected to the converter.

The same way as described here-above in conjunction with means 200, corresponding means 200', comprising levers 201' and 202', as well as converter 204' and bearing 203', are provided to force the receptacles on top of the vanes, comprising lids 10'-14' and lids 110'-114' (wherein lids 10' and 110' are provided with sub-lids 120' and 1120' respectively), to adopt the first configuration when the vane travels in the direction of the wind. Correspondingly, the energy that is released when lids 110' through 114' close upon acting of gravity and the wind, is transferred via converter 204' to have lever 201' actuated to force lids 10'-14' to move upwards such that the corresponding receptacles take the first configuration.

FIG. 4

Figure 4:
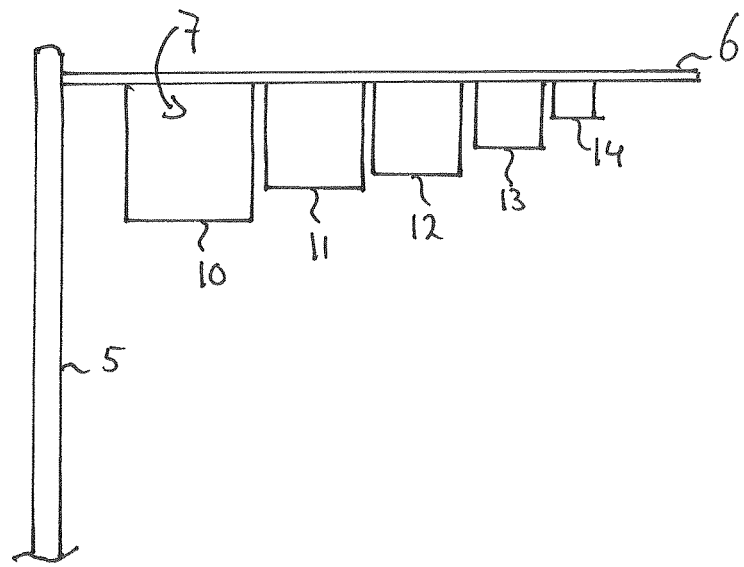
FIG. 4 is a schematic representation of an alternative embodiment of a turbine according to the invention.

FIG. 4 is a schematic representation of an alternative embodiment of a turbine according to the invention. In this embodiment, the vane 6 is provided with multiple receptacles such that a receptacle positioned near the support has a larger cross-section than a receptacle positioned further away from the support. In this embodiment, each receptacle 7 is formed between a lid and the bottom side of the vane (cf. FIG. 2). By having lids of different sizes, such that a lid has a larger surface when being nearer to the support 5, a receptacle positioned near the support has a larger cross-section than a receptacle positioned further away from the support.

FIG. 5

Figure 5:
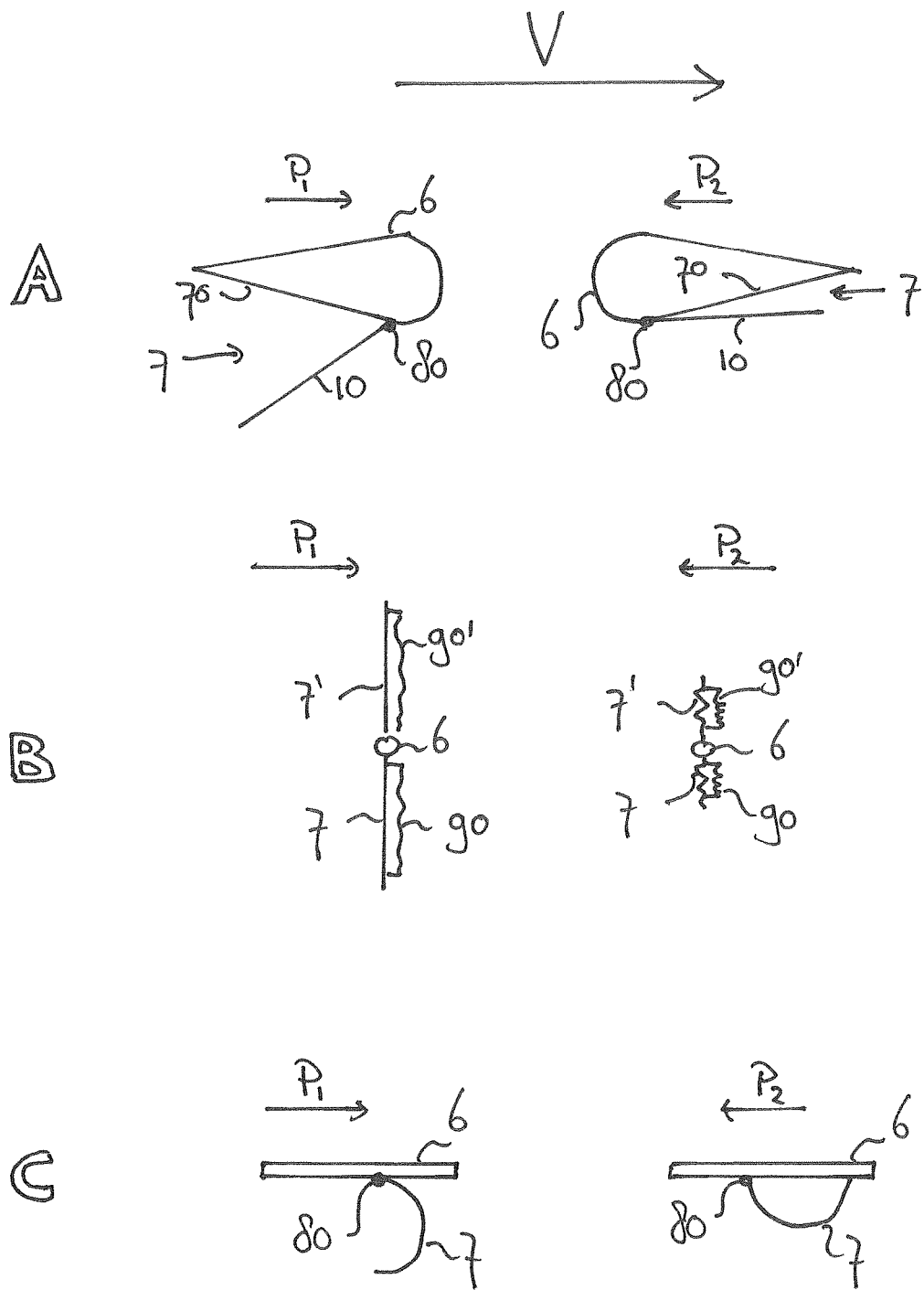
FIGS. 5A-5C schematically depict various receptacles for use in the present invention.

FIG. 5 schematically depicts various receptacles for use in the present invention. The direction of the wind V is depicted, and applies to FIGS. 5A, 5B and 5C.

Figure 1:
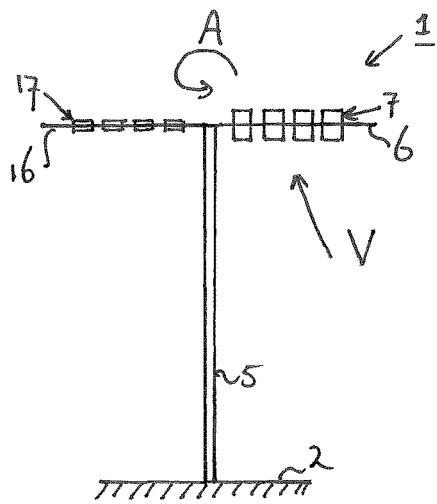
FIG. 1 is a schematic representation of a wind turbine according to the invention.
Figure 2:
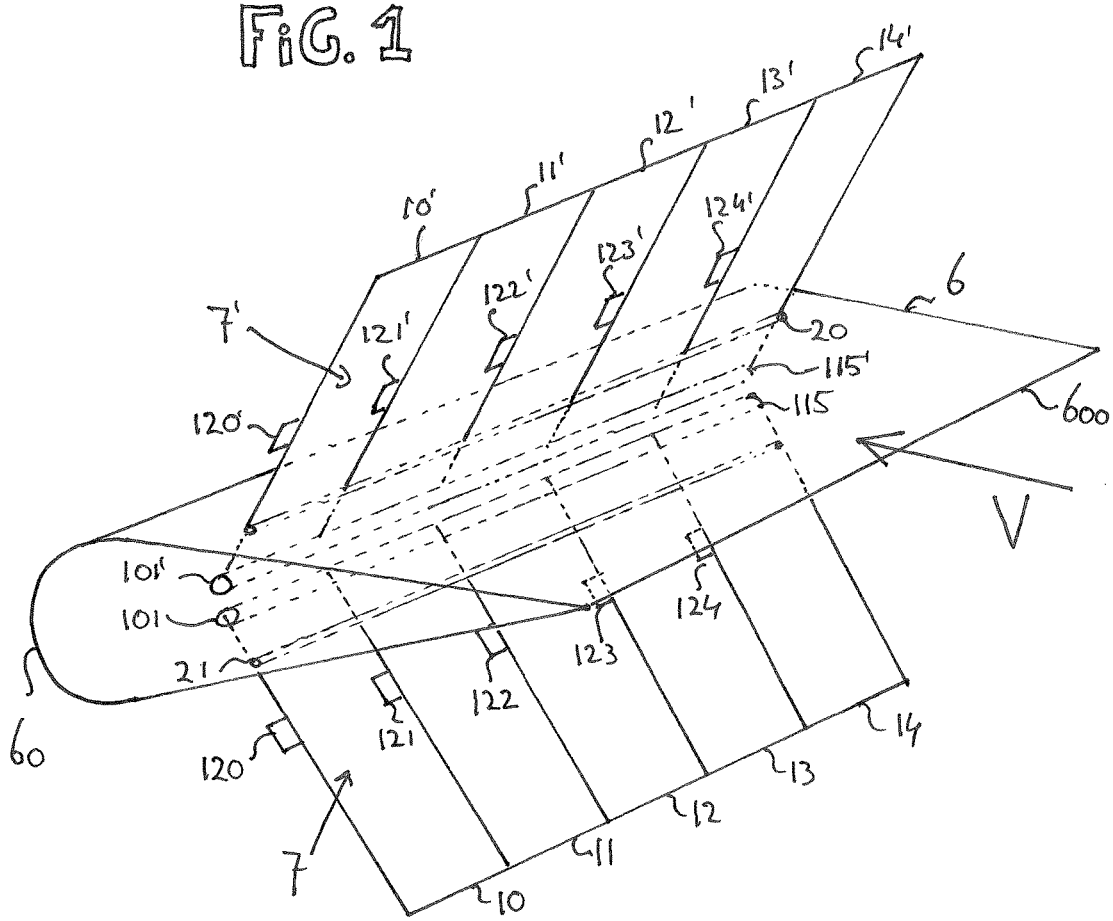
FIG. 2 is a schematic representation of a vane according to the invention.
Figure 3:
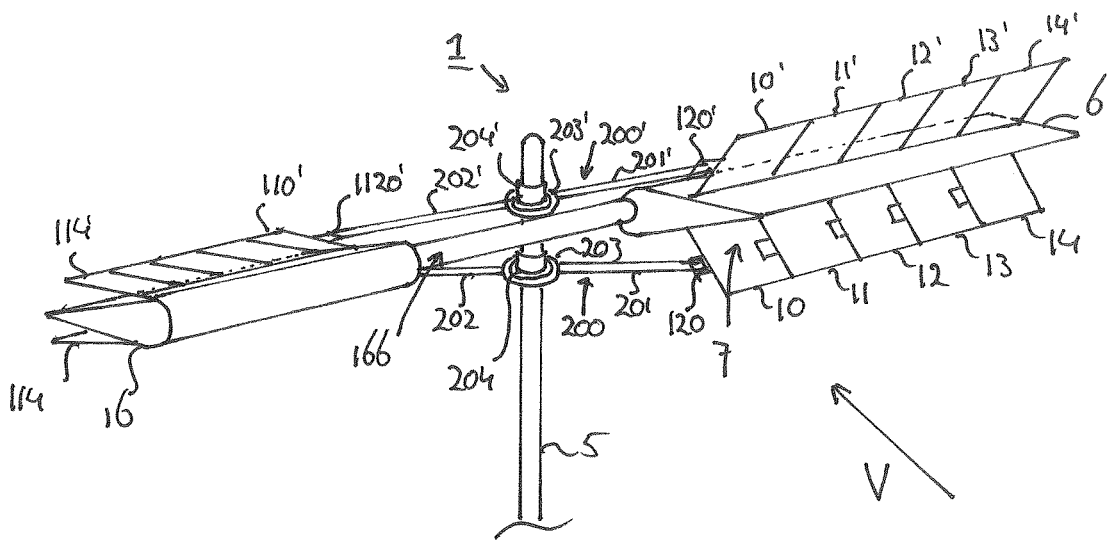
FIG. 3 is a schematic representation of a wind turbine according to the invention, comprising two vanes and depicting means operable to force the receptacle to adopt the second configuration.

In FIG. 5A a receptacle 7 is shown which corresponds in form with the receptacle as depicted in FIGS. 2 and 3. In the left-hand side situation of FIG. 5A the receptacle, comprising a lid 10 and the bottom side 70 of vane 6, the lid being hinged using hinge 80 at the downstream end of the vane, has adopted the first configuration, i.e. the configuration wherein wind is to be catched by the receptacle to covert wind energy into motion of the vane. The direction wherein the vane travels is indicated as P1. In the right-hand side situation of FIG. 5A, the same receptacle has adopted the second configuration, in which configuration less wind has to be catched to makes travel in the direction P2, against the direction of the wind V not consuming too much energy.

In FIG. 5B an alternative embodiment of a receptacle 7 is schematically shown. In this case the vane 6, consisting of a simple tube, is provided with two vertically extending members 7 and 7' which act to catch the wind in order to move the vane in the direction P1. Each member is provided with a spring 90 and 90' respectively which is shown in extended configuration in FIG. 5B. When the vane has to travel against the wind V, in the direction indicated with P2, the springs 90 and 90' are released and they force the members 7 and 7' to take a shorter configuration (the second configuration in the sense of the present invention) such that they catch considerably less wind.

In FIG. 5C yet another embodiment of a receptacle in the sense of the present invention is schematically depicted. In this case the receptacle 7 is a half cup, mounted via a hinge 80 to the bottom of vane 6. When this vane travels in the direction of the wind, indicated as P1, the cup is positioned as shown in the left-hand side drawing of FIG. 5C. The hinge prevents that the cup takes another position and the cup is perfectly positioned to maximally catch the wind V. When the vane is supposed to travel against the wind V in the direction indicated with P2, the cup is forced to be hinged towards the bottom of the vane and take the position as indicated in the right-hand side drawing of FIG. 5C. In this configuration, the receptacle has adopted a configuration that catches far less wind and the vane easily travels against the direction of the wind.

FIG. 6

Figure 6:
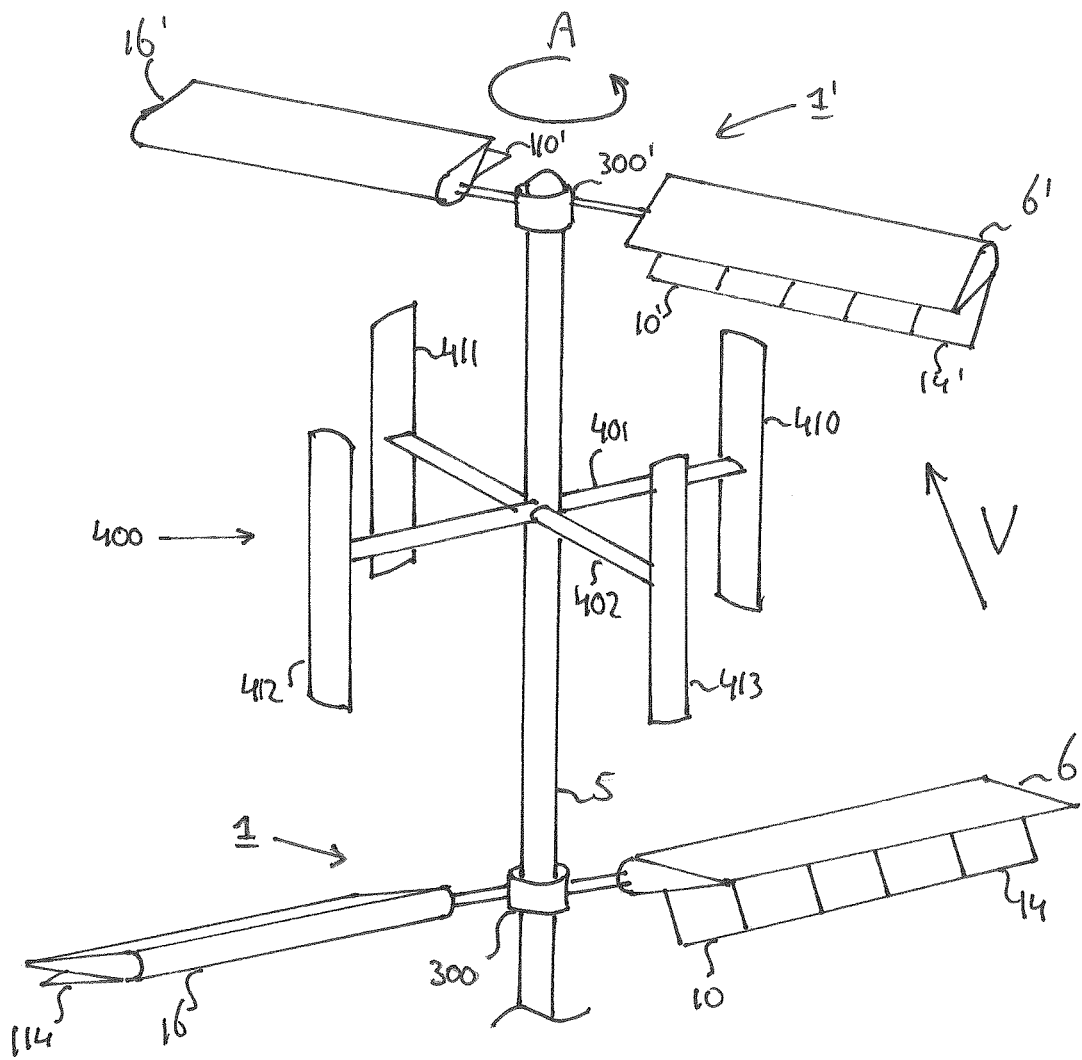
FIG. 6 schematically depicts a combination of two wind turbines according to the invention with a Darrieus wind mill.

FIG. 6 schematically depicts a combination of two wind turbines (1, 1') according to the invention with a Darrieus wind mill (400). This Darrieus mill 400 corresponds to the mill as shown in the above reference Chinese patent application CN 101737252A. The direction of the wind is indicated with a V, which corresponds to a rotation of the mill in direction A. This mill is supported by axle 5 and comprises bars 401 and 402 that carry vanes 410, 412 and 411, 413 respectively. To the same support 5, two wind turbines 1 and 1' according to the present invention are operatively connected using clutches that allow that each of these wind turbines rotates at various revelations per minute for a predetermined number of revelations per minute for the Darrieus wind mill 400. These clutches are indicated in FIG. 6 with reference numerals 300 and 300" and in this embodiment are hydraulic clutches.

The combined wind mill may function as follows. When the wind speed is zero, all vanes remain at the position they are. The receptacles all take the second configuration, by having the lids, forced by the contra-weights (see FIG. 2) take a position near the bottom of the corresponding aerofoil shaped vanes. When the wind starts blowing in the direction V, the receptacles of the vanes 6 and 6' (comprising lids 10-14 and 10'-14' respectively) open (i.e. they adopt the first configuration in the sense of the present invention) under influence of the wind and gravity. As a result, both the turbines 1 and 1' start rotating around the support 5. As soon as the vanes 6 and 6' take a position wherein they have to travel against the direction of the wind, the receptacles, by using the means operable to force the receptacles to adopt the second configuration (means as such not shown in FIG. 6) are forced to take close. The receptacles of the vanes 16 and 16' on the other hand then open to take the first configuration to catch wind and convert wind into motion of the vanes. At low revs, the clutches 300 and 300' do not pass any motion to the axle 5. As soon as a threshold rpm is reached, the clutches are actuated to pass part of the motion of turbines 1 and 1' to axle 5, whereupon the Darrieus mill will start rotating in the indicated direction A. This way, the Darrieus mill does not need any auxiliary motor to start (as known from the prior art).

When the Darrieus mill, at very high wind speeds for example, runs the risk of rotating too fast, the turbines 1 and 1' can be used to slow down the mill by forcing the receptacles to take the first configuration (or at least a configuration wherein the lids are opened at least partly) typically when a vane has a position such that it travels against the direction of the wind. This way, the vanes of the turbines will be slowed down, which slowing down may be passed via clutches 300 and 300' to axle 5 to slow down the Darrieus mill 400.

FIG. 7

Figure 7:
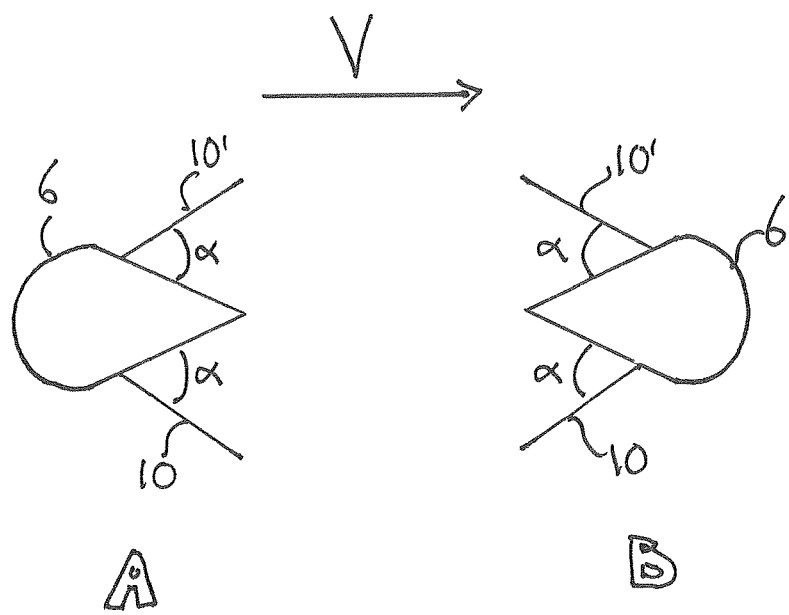
FIGS. 7A and 7B illustrate the capacity of a receptacle to convert wind force into motion.

This figure, consisting of FIGS. 7A and 7B, illustrates the capacity of a receptacle to convert wind force into motion. As defined supra, the capacity of a receptacle to convert wind force into motion is the conversion a receptacle can provide when this receptacle is ideally positioned with respect to the direction of the wind, i.e. the receptacle is positioned such that the wind is maximally "caught". As illustrated in FIGS. 7A and 7B, although the wind blows in both subfigures in the indicated direction V, the capacity of the receptacles (formed by lids 10, 10' and the vane 6) to convert wind force into motion is in both figures the same. This is because the angles $\alpha$ in FIGS. 7A and 7B are the same, as well as the dimensions of the vanes and lids. In each of the two showed cases, when the receptacles would be ideally positioned with respect to the direction of the wind (which is the case in situation 7B in this example), then the capacity is exactly the same for the receptacles of FIG. 7A as for the receptacles of FIG. 7B.

FIG. 8

Figure 8:
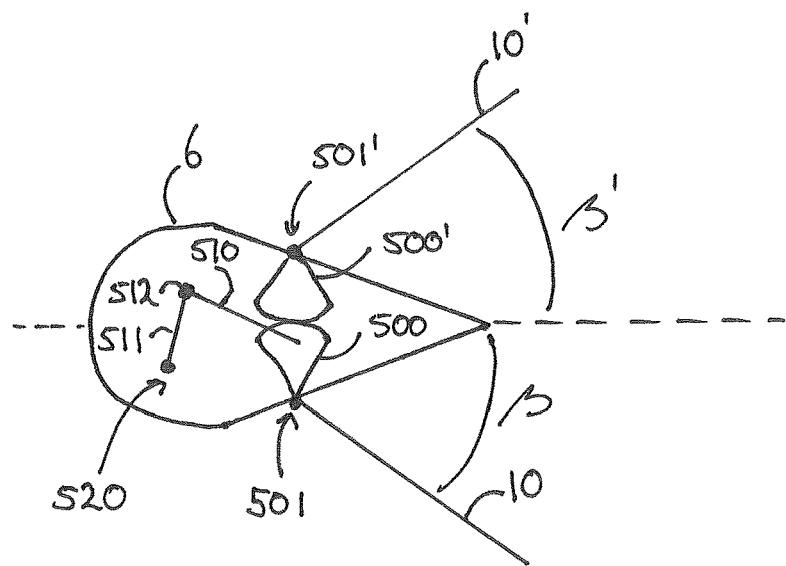
FIG. 8 schematically represents a system for providing the configurations of wind receptacles.

FIG. 8 schematically represents a system for providing the configurations of wind receptacles. In particular in a situation where a vane has a first receptacle on the upper side of the vane, and a corresponding receptacle on the lower side of the vane, it is important not only that the constituting parts of the receptacles have the same dimensions, but also that these parts make sure that the receptacles have the same capacity to convert wind force into motion. This is important to prevent, or at least minimize, torsion in the vane. When the upper receptacle (formed by lid 10' and the vane 6) would for example open further than the lower receptacle (formed by lid 10 and vane 6), then a torsion would arise when the vane would travel in the direction of the wind, and even when the vane would travel against the direction of the wind (although the effect for the shown receptacle would be somewhat smaller). In order to provide an exact concurrent movement of the lids 10 and 10', these lids are operatively connected by half-pinions 500 and 500', which pinions rotate around axes 501 and 501' respectively. The lower pinion is connected to a push/pull bar 510, which is connected to a lever 511 via hinge 512. The lever 511 can rotate around axis 520. By rotating lever 511 around axis 520, the lids 10 and 10' will move such that the respective angles β and β' will be in essence of the same magnitude in all circumstances (depending mainly on the tolerances in the pinion's and the connection of the pinions and lids to axis 501 and 501'). It is noted that in an embodiment the rotation of the lever 511 around axis 520 is controlled via a rail that is formed around the central; support of the turbine (not shown in FIG. 8), the rail constituting a guide for a follower that is operatively connected to the lever 511.

It is noted that the shown system of half pinions can be advantageously used in any prior art turbine that uses upper and lower lids for constituting receptacles of varying capacity. In other words, the invention is also embodied in a vane that comprises two receptacles positioned at corresponding sites above and below the vane, the receptacles being formed by lids that can open and close with respect to the vane, wherein each of the lids of the said two receptacles is rotatably positioned in the vane by connection to a pinion, the two pinions cooperate via a grasping connection.

What is claimed is:

1. Wind turbine for converting wind into mechanical energy, comprising:
    a support,
    a vane rotatively connected to said support, the vane comprising multiple receptacles positioned along a length of the vane, each receptacle adapted to adopt a first configuration when the vane is in a position to travel in a direction of the wind, in which first configuration the receptacle has a first capacity to convert wind force into motion of the vane, and a second configuration when the vane is in a position to travel against the direction of the wind, in which second configuration the receptacle has a second capacity to convert wind force into motion of the vane, the second capacity being lower than the first capacity, and one of said multiple receptacles positioned near the support has a larger cross-section than one of said multiple receptacles positioned further away from the support, and
    an arrangement that is operable to force each receptacle to adopt at least one of the said configurations independent from the direction of the wind,
    wherein the multiple receptacles are operatively connected such that when a receptacle of the multiple receptacles adopts the second position, a receptacle of the multiple receptacles next to the receptacle that adopts the second position, viewed in a direction away from the support, automatically adopts the second position.

2. Wind turbine according to claim 1, each receptacle adopts one of the said two configurations under the influence of gravity and the wind, and the other configuration by operation of said arrangement.

3. Wind turbine according to claim 1, wherein the arrangement is operable such that each receptacle adopts the second configuration by operation of said arrangement when the vane is in a position to travel against the direction of the wind.

4. Wind turbine according to claim 1, wherein the vane includes an aerofoil shaped body, and each receptacle is formed by a lid and the aerofoil body, the lid being hinged to the body at a position adjacent a downstream end of the said body.

5. Wind turbine according to claim 1, wherein the vane comprises a first of said multiple receptacles at a top side of the vane and a second of said multiple receptacles at a bottom side of the vane.

6. Wind turbine according to claim 1, wherein the vane is part of a rotor that is rotatably connected to the support, and the rotor comprises multiple vanes.

7. Wind turbine according to claim 6, wherein the turbine comprises multiple rotors.

8. Use of a wind turbine according to claim 1, wherein the turbine converts wind into work.

9. A wind turbine according to claim 1, wherein the wind turbine is used with a Darrieus wind mill and the wind turbine is operatively connected to the Darrieus wind mill by an operative connection which comprises a clutch that allows that the wind turbine to rotate at various revolutions per minute for a predetermined number of revolutions per minute for the Darrieus wind mill.

10. A wind turbine according to claim 9, wherein the clutch is selected from the group consisting of a centrifugal clutch, an hydraulic clutch, a slipper clutch, an electromagnetic clutch and a vee-belt clutch.

11. A wind turbine according to claim 1,
    wherein the said first and second configurations are induced only by at least one of the following:
    wind,
    gravitational forces and
    said arrangement,
    wherein the vane comprises said multiple receptacles as multiple separate receptacles positioned along the length of the vane,
    wherein one of said multiple receptacles positioned near the support has a larger maximum capacity to convert wind force into motion than one of said multiple receptacles positioned further away from the support.

12. A vane provided with at least one of multiple receptacles as defined in claim 1, and further comprising an arrangement as defined in claim 1 for use in adopting the first and second configuration.

13. A vane according to claim 12, wherein the vane comprises two of said multiple receptacles positioned at corresponding sides above and below the vane, the two receptacles being formed by lids that can open and close with respect to the vane, each of the lids of the said two receptacles is rotatably positioned in the vane by connection to a pinion, and the two pinions cooperate via a grasping connection.

* * * * *